United States Patent
Schoenke

(10) Patent No.: US 7,837,022 B2
(45) Date of Patent: Nov. 23, 2010

(54) VERTICAL PARALLEL TRANSPORTATION OF CAPS

(75) Inventor: Hans-Juergen Schoenke, Boehme (DE)

(73) Assignee: Silgan Holdings, Inc., Stamford, CT (US)

( * ) Notice: Subject to any disclaimer, the term of this patent is extended or adjusted under 35 U.S.C. 154(b) by 74 days.

(21) Appl. No.: 11/852,876

(22) Filed: Sep. 10, 2007

(65) Prior Publication Data

US 2008/0267746 A1 Oct. 30, 2008

Related U.S. Application Data

(62) Division of application No. 10/829,387, filed on Apr. 22, 2004, now Pat. No. 7,331,443.

(51) Int. Cl.
*B65G 47/24* (2006.01)
(52) U.S. Cl. ...................................... 198/398
(58) Field of Classification Search ............... 198/401, 198/398, 442, 448, 454, 493, 439, 438, 690.1, 198/805, 370.13, 370.11, 381, 428, 350, 198/457.05
See application file for complete search history.

(56) References Cited

U.S. PATENT DOCUMENTS

| | | | | |
|---|---|---|---|---|
| 2,315,880 A | * | 4/1943 | Stiles | 198/454 |
| 2,690,251 A | * | 9/1954 | Carter | 198/448 |
| 2,752,027 A | * | 6/1956 | Gentry | 198/442 |
| 2,753,975 A | * | 7/1956 | Day et al. | 198/448 |
| 3,265,185 A | * | 8/1966 | Weselik | 198/396 |
| 3,643,782 A | * | 2/1972 | Risley | 198/383 |
| 3,756,401 A | | 9/1973 | Rosner | |
| 4,081,069 A | * | 3/1978 | Ono | 198/381 |
| 4,386,708 A | * | 6/1983 | Sieverin | 209/549 |
| 4,457,434 A | | 7/1984 | Brown et al. | |
| 4,722,283 A | | 2/1988 | Holley | |
| 4,823,931 A | * | 4/1989 | Rhodes et al. | 198/445 |

(Continued)

FOREIGN PATENT DOCUMENTS

EP 0782888 A2 7/1997

(Continued)

*Primary Examiner*—Gene Crawford
*Assistant Examiner*—William R Harp
(74) *Attorney, Agent, or Firm*—Hunton & Williams LLP

(57) ABSTRACT

A device for conveying closures (D) made from metallic sheet in an essentially vertical direction from a collecting point (1) to a release point (6) is proposed. The closures are selected to be in correct position during conveying in order to release at the release point (6) only same-lying closures in a row of closures following one another closely. A conveyer belt (10) serves for the transport (v1, v2) of the closures. A sensor and discharge device (17, 16, 19, 18; 3) serves for detecting wrong-position closures and for lateral discharge (q1, q2) of individual wrong-position closures. In the course of the conveyer belt (10) upstream of the sensor and discharge device, a bar (15) is arranged above the conveyer belt, which terminates after the sensor and discharge device (17, 16, 19, 18; 3). More than one row (R1, R2) of closures next to one another may be supplied separately to the sensor and discharge device (17, 16, 19, 18; 3). The performance itself is thus increased if the speed of the belt (10) is reduced. Performance is understood to mean the number of conveyed lids/minute which hitherto reached an order of magnitude of about 800 lids/minute.

7 Claims, 5 Drawing Sheets

U.S. PATENT DOCUMENTS

| | | | |
|---|---|---|---|
| 4,917,227 A | 4/1990 | Matsuo | |
| 4,938,336 A | 7/1990 | Aquino et al. | |
| 4,977,998 A * | 12/1990 | Middeldorp | 198/395 |
| 5,224,585 A | 7/1993 | Blanco | |
| 5,297,667 A | 3/1994 | Hoffman et al. | |
| 5,388,682 A | 2/1995 | Dudley | |
| 5,423,410 A | 6/1995 | Keller | |
| 5,680,922 A | 10/1997 | Bessels | |
| 5,761,883 A | 6/1998 | Pruett et al. | |
| 5,819,907 A | 10/1998 | Simkowski | |
| 5,896,977 A | 4/1999 | Ouellette | |
| 6,062,395 A * | 5/2000 | Oravetz et al. | 209/644 |
| 6,138,817 A | 10/2000 | Hjalmarsson et al. | |
| 6,189,702 B1 | 2/2001 | Bonnet | |
| 6,227,348 B1 * | 5/2001 | Frei et al. | 198/439 |
| 6,325,200 B1 * | 12/2001 | Poppi | 198/395 |
| 6,401,904 B1 * | 6/2002 | Risley | 198/380 |
| 6,961,638 B2 * | 11/2005 | Ouellette | 700/213 |
| 2003/0009992 A1 | 1/2003 | Keen | |
| 2004/0162632 A1 | 8/2004 | Prutu | |

FOREIGN PATENT DOCUMENTS

| | | |
|---|---|---|
| EP | 1072513 A1 | 1/2001 |
| WO | WO 0155014 A1 | 8/2001 |

\* cited by examiner

VERTICAL PARALLEL TRANSPORTATION OF CAPS

CROSS-REFERENCE TO RELATED APPLICATIONS

This application claims benefit under 35 U.S.C. §120 and is a divisional of U.S. application Ser. No. 10/829,387, filed Apr. 22, 2004 now U.S. Pat. No. 7,331,443.

FIELD OF THE INVENTION

The invention is concerned with a process for the conveying of closures made from metal sheet (metallic sheet).

BACKGROUND OF THE INVENTION

Conveyer devices for preferably vertical conveying of closure lids made from magnetically attractable (ferromagnetic) metal sheet are in essence a way of separating a quantity of individual closures collectively conveyed or taken from a container, and which are guided together to form a line of closures, which line is conveyed upwards by a conveyer belt in longitudinal direction. In the course of longitudinal conveying, a blow-off device, which is coupled functionally to a sensor device which detects whether the closure, which in each case has just arrived below the sensor device, is placed in the row in the correct position or in the wrong position, is arranged laterally at one point of the conveyer belt. This identification can be achieved easily due to the cap structure of the closure lid, because the covering wall (surface or "panel") of the closure lid of U-shaped section produces a different sensor signal than the measurement in the hollow interior of the cap. Therefore the closure lids, which lie in the row with their edge bars or edges on the conveyer belt and with their flat upper sides (covering walls) pointing towards the sensor, may be easily identified. These caps are blown off laterally by a pulse of compressed air so that fewer closures remain, which are conveyed in longitudinal direction, after the sensor and discharge device. Hence the closures are cleared-up with regard to their position. Hence, only correct-position closures are found in the row which is now provided with gaps, so that the conveying capacity is reduced (internal use, no publicly accessible reference known).

In order to compensate the reduction in conveying capacity, attempts have been made for a long time and also developments successfully concluded, in which the cap-like closures—instead of being blown off—are rotated using a turning device and again placed in the row, see for example WO-A 01/55014 (CCS&CMB), page 8 there, lines 16 to 22 and claim 13 there, feature (ii). A reduction in the performance, measured in (correctly lying) closure lids ("closure") per minute (or lids or caps per minute) may thus be avoided, in each case compared at the same speed of the conveyer belt.

BRIEF SUMMARY OF THE INVENTION

The invention takes a different path. As a technical way of looking at a problem, it may not only retain the conveying capacity (performance), but optionally also increase it without using an expensive device for turning the lids or having to accelerate the belt. Rejecting the aim of the state of the art, the performance should thus be able to be increased even if the speed of the belt is reduced. Performance is understood to mean below the number of conveyed lids/minutes, which currently reaches an order of magnitude of about 800 lids/minute.

According to the invention as claimed, considerably more or a large number of lids are supplied in parallel to a sensor and discharge device on the conveyer belt, so that the loss due to discharge of lids not placed in correct position is not crucial or hardly crucial.

According to the invention, the performance may be almost doubled, easily dependent on how many closures are situated in the wrong position in the several rows (preferably two rows) of supplied lids.

For two tracks or lines of parallel conveyed lid rows which are supplied adjacently on the conveyer belt, separated by a bar which divides the conveyer belt preferably essentially centrally into two longitudinally directed elongated conveying sections, the conveying capacity is virtually doubled. The two rows supplied to the sensor and discharge point are guided together again after the end of the bar physically separating them, following the sensor and discharge device, in order to form a row of closures following one another closely or a virtually gap-less chain of closures. This row may also be called a "closure string" or a virtually gap-less chain of lined-up closures, which are released for further processing or processing at the outlet of the conveyer device.

The supply of such closure lids may take place from a container, in which they are stored in bulk. Suitable metallic (ferromagnetic) closures are those which are used in packaging technology, for example sheet metal lid closures with covering wall and peripheral wall and thereon radially inwardly pointing cams for forming "cam rotary closures". They may be conveyed by the device, wherein the released closure string of lids is either further processed or is further conveyed to the closing machine.

Under the assumption of doubling the supplied quantity indicated above at the same speed of the conveyer belt, it depends on the number of lids not lying in the correct position as regards the actual capacity increase achieved. Assuming hypothetically that no such lids are in both conveying strings, the capacity may be doubled. However, usually this cannot be assumed so that a certain number of supplied lids do not lie in the correct position, statistically seen in each row half, so that the performance is at least equal even without a lid turning device with respect to single-track conveying supplied only in correct position. In a comparison with single-track conveying—with lids statistically distributed half in correct position and half in wrong position—the invention achieves essentially virtually double the performance.

Those lids which lie in the wrong position are rejected at the sensor and discharge station only from the direction of running of the belt, in most cases laterally ejected, and fall back into the container described, from where they are taken up again and supplied.

Ejection of the lids may take place on two sides, depending on the separating device as, for example the bar, which both lid rows pass guided in parallel. Starting from that, ejection may take place to the one or to the other side, that is on both sides. A blow-off pulse of compressed air thus comes from the centre of the belt and is triggered by nozzles which are directed in opposite manner. They are arranged firmly on the bar and do not change their height relative to the surface of the belt for a size/height of closure lids. If the type of conveyed closure lids is changed, that is either in their diameter or in their height, adjustment may take place at the sensor and discharge device. At least the sensors of the sensor and discharge device may thus be adjusted at a height relative to the surface of the belt. The sensitivity of the sensors may also be adjusted by the height adjustment.

Tests have shown that increases in capacity up to 1,500 lids/minute may be achieved using the conveyer method as claimed for essentially the same belt speed of a comparable plant.

Discharge is favoured if the sensor device and the discharge device are spaced slightly in longitudinal direction in each case on one of the two adjacent conveying sections. Hence, time delays may be compensated by the sensor when detecting a wrong-position closure, whereas the conveyer belt continues to move the closure lid just measured and detected by the sensor.

Laterally projecting guide strips may conduct the rejection of the lid and ensure that the lateral ejection movement is always converted into a downward movement, supplemented by the force of gravity, so that the lids lying in the wrong position are returned to the collecting container.

If the sensors can be adjusted in their height position relative to the belt surface, the conveyer device may be adapted in height to different lids. Different lid diameters between, for example about 27 mm up to for example about 53 mm may also be conveyed by the same arrangement which is only limited in the conveyable maximum diameter in that the remaining belt sections on both sides of the bar should still be so wide to be able to accommodate the flat sides (the ferromagnetic covering walls) of the lids and to convey them by frictional force, whereas magnets are provided which press the lids onto the surface of the conveyer belt with their magnetic force. Adjustment of the distance of the elongated magnet may influence this force, which acts on the ferromagnetic lids.

In the guiding-together region, an elongated magnet, which is at an angle with respect to the longitudinal axis of the belt and which favours guiding together is provided. It starts from the end of the first elongated magnet which essentially terminates where the sensor and discharge device is arranged, and extends at an angle upwards in the direction towards one edge of the belt in the case of a vertically standing device. Both rows of closures cleared of wrongly lying closures are guided together by this magnet guide lying at an angle and reach the discharge end. Guiding together takes place on the same conveyer belt, on which supply to the sensor and discharge device also took place, only after the latter. Without interposing further conveyer belts or diverting points for the conveyed closure lids, supplying of the non-uniform lid rows and guiding together of only correct-position lid rows is achieved in a small space or a short length.

A further guide member may achieve support here and improve the formation of the row of closures following one another closely. It is arranged upstream of the discharge and at a distance from the sensor and discharge device. It has a guide surface or guide edge at an angle to the longitudinal axis of the belt or central plane and can be pivoted in a small pivoting angle about a pivotable bearing, depending on a pressure which is exerted on the guide member by the several closure lids supplied—in the guiding-together region.

The guide member at the discharge end is biased by a spring force (resiliently flexible), so that deflection effects an increase in spring force, in order to optionally release wedged lids at their pointed end (nose end) and to make them either into such lids which run into a feed hopper to form the lid row following one another closely or to make them into such lids which slide along a deflecting edge of this guide member and are deflected laterally from the conveyer belt in order to also fall back into the collecting container.

The guide member after the sensor and discharge device guides together the several separate rows in a guiding-together section into the row of closures following one another closely.

The elongated magnetic device in the guiding-together region and/or the elongated magnetic device in the upstream region, which upstream magnetic device extends into the sensor and discharge region, may be composed of individual piece magnets, which are inserted in an elongated, flat support arrangement. An elongated magnetic device, which fixes the single individual magnets against one another, is thus produced. Due to the position of the accommodation points in the support arrangement, track sections (guide lines) are defined which consist in each case of individual magnets. At least one of these track sections is inclined with respect to a central plane of the conveyer belt in order to form the inclined elongated magnetic device. This inclination relates to the guiding-together region, where a row is formed from several rows of closure lids, which takes place like points by presetting the individual magnets along guide lines at different angles—to a vertical (for example the central plane).

Also upstream of the guiding-together region, the elongated magnetic device may consist of two spaced rows of individual magnets, which are arranged so that in each case one row lies on this side and that side of the bar and is arranged below the conveyer belt.

BRIEF DESCRIPTION OF FIGURES

The invention is illustrated and supplemented using exemplary embodiments.

DETAILED DESCRIPTION OF PREFERRED EMBODIMENTS

Figure 3:
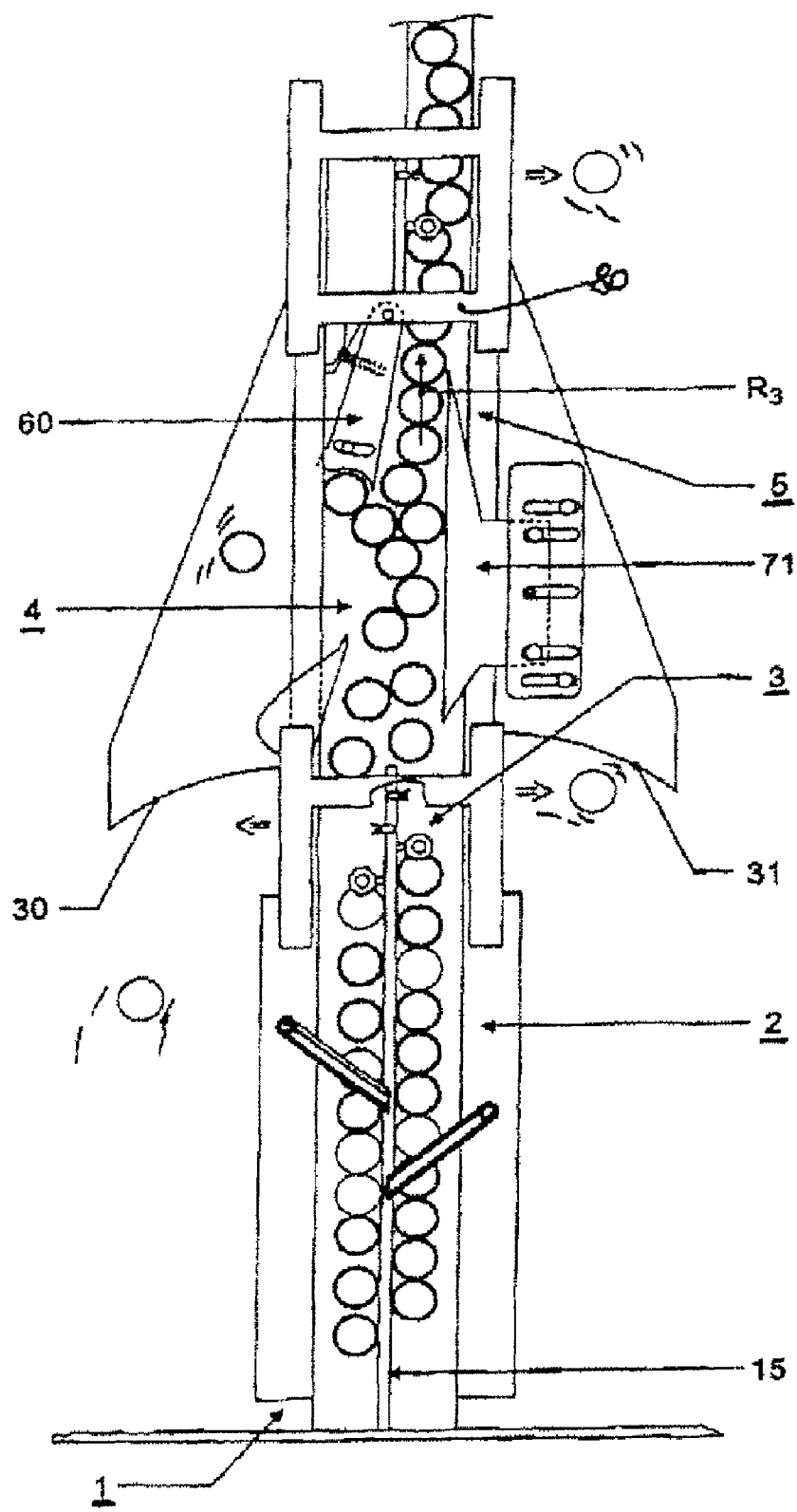
FIG. 3 is a complete view of the vertically erected conveyer device with sections 1 to 6.

The device for conveying the metallic closure lids operates vertically, as may be seen using an example from FIG. 3. Starting from a container—not shown in more detail—lying at the bottom in section 1 of the conveyer device, into which a continuous conveyer belt 10 engages, closure lids D are moved upwards along two tracks on the continuous conveyer belt 10. A combined section of sensors 17, 19 and discharge devices 16, 18, which may be formed as metal sensors or blowing nozzles for compressed air ejection, is situated in section 3 approximately at the central height. A bar 15 extends into the collecting container and lies above the upper side of the upper conveyer strand of the conveyer belt 10. The bar extends into the section 3, where the sensor and discharge device is arranged. The collecting section 4, in which closure lids are guided together without a bar design, starts above section 3 towards a feed hopper which is formed in section 5.

FIG. 3 shows on the left of the feed hopper a moveable guide member, the pivoting axis of which is arranged below a carrying strap 80. After the hopper section 5, a discharge section 6 is connected, which releases a row of closures following one another closely and which are moved upwards, optionally are then diverted and are supplied to their use or application or reprocessing.

Figure 1:
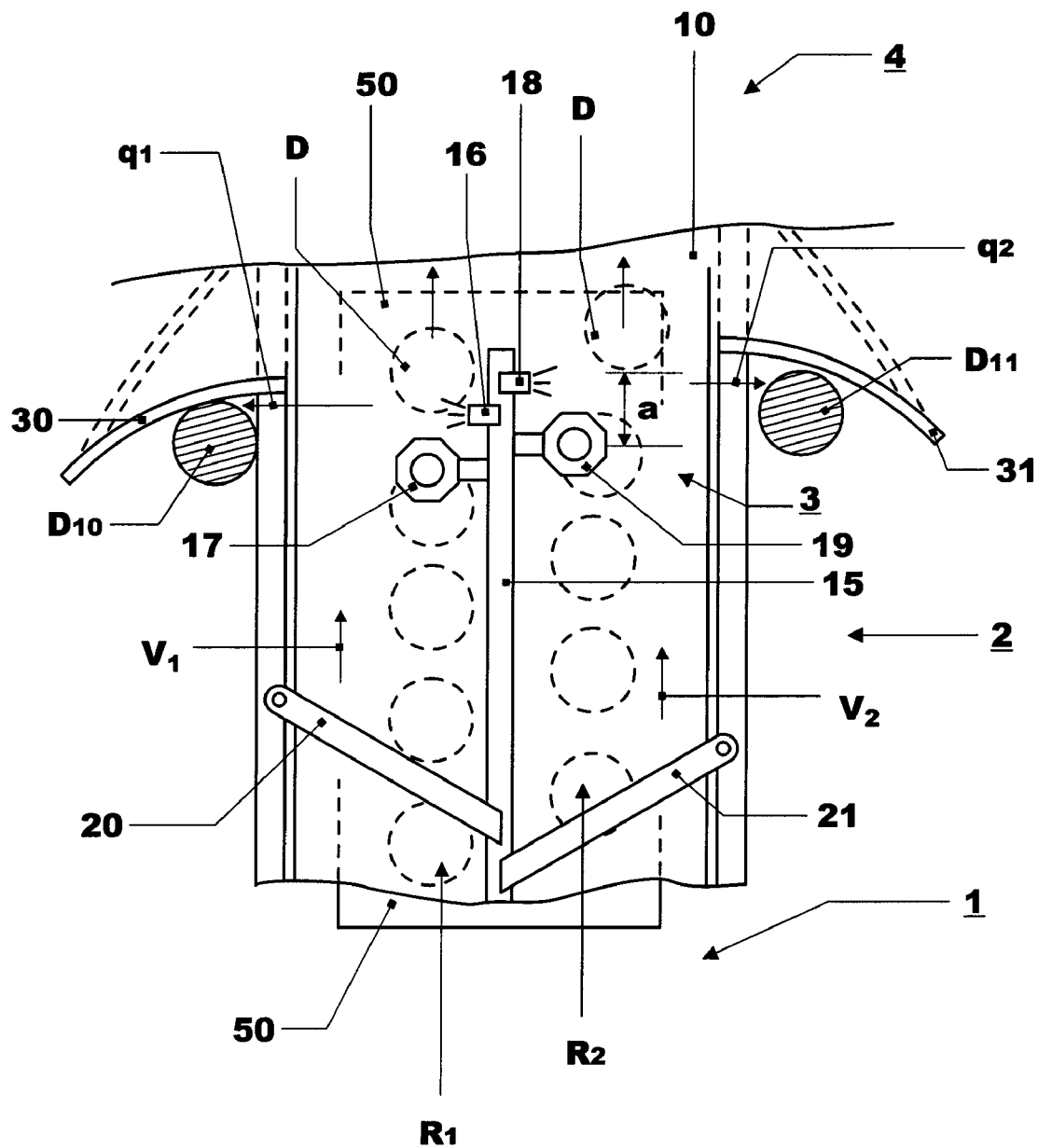
FIG. 1 is a schematic view of a first section 2, 3 of the conveyer device.
Figure 2:
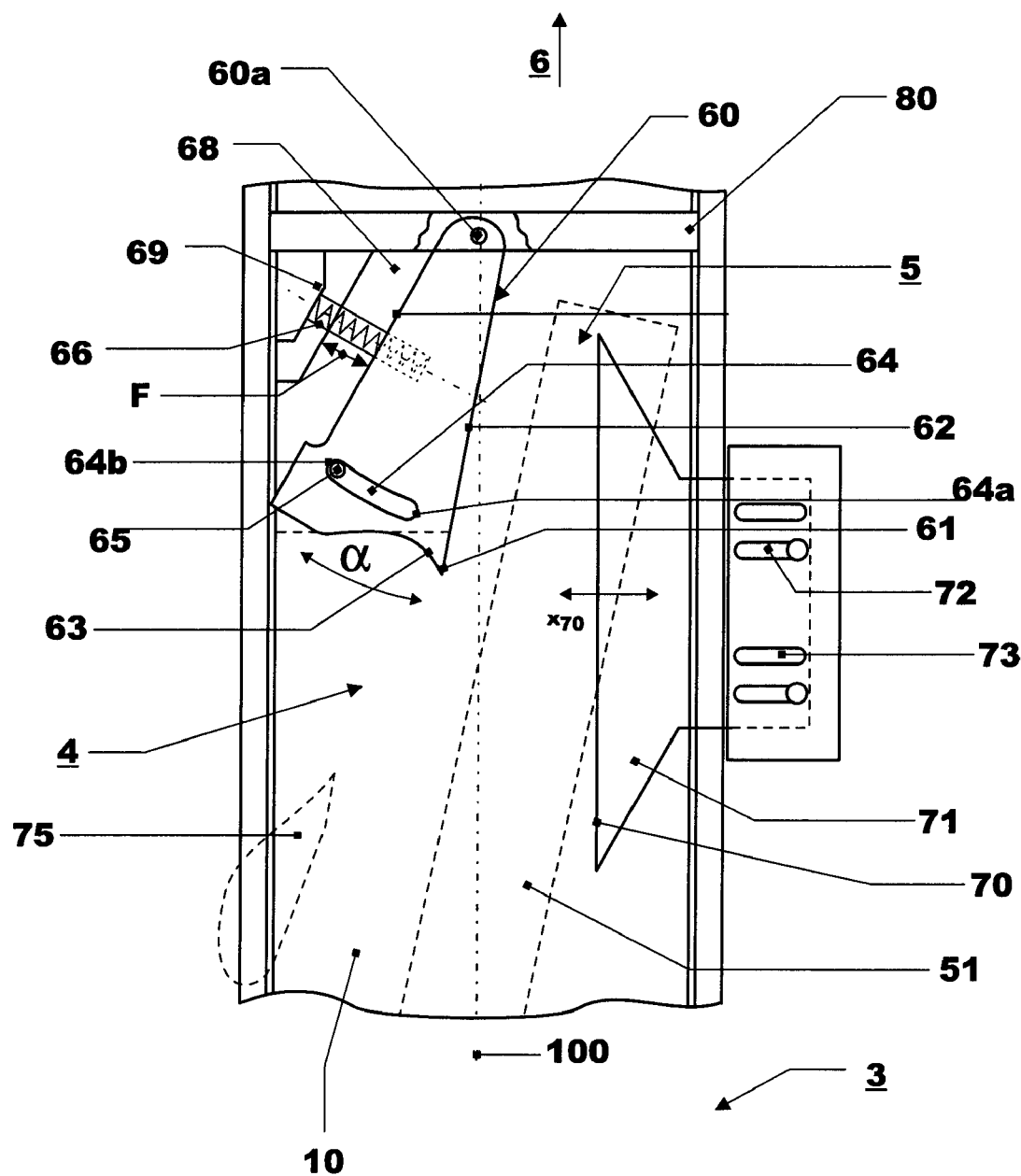
FIG. 2 is a schematic view of a second section 4, 5 of the conveyer belt, above FIG. 1.

The lower section 2, 3 above the collecting point 1 in the container is shown in FIG. 1. The upper section 4, 5, starting after the sensor and discharge device 3 (or the section 3 of the conveyer path), is illustrated in FIG. 2.

Lids in correct position and wrong position can be seen from FIG. 3. A wrong-position closure is placed so that the peripheral wall points towards the conveyer belt and in the plan view of FIG. 3, the outer surface of the covering wall of the closure can be seen. A correct-position closure is placed so that the covering wall of the particular closure lies on the conveyer belt, on which the covering wall is pressed by a magnetic force of attraction of a device 50, which is arranged below the upper strand of the conveyer belt. The peripheral wall can be seen as an edge line pointing upwards towards the observer in FIG. 3. Due to the frictional force between a particular closure lid and the surface of the conveyer belt, a transporting force (by means of the frictional force formed via $\mu_R$) may be transferred by pressing. Nevertheless, the lids also slip on the conveyer belt if they abut against one another or come across obstacles, as shown in FIG. 3 in section 4 at the inlet of the hopper section 5. Several lids abut against one another here and are jostled into the inlet, wherein those lids are also shown which are ejected laterally, because they may no longer be taken up by the hopper section due to the excess quantity of available (transported) lids.

The belt according to FIG. 1 is moved upwards. In each case one of two rows R1, R2 of closure lids D can be seen on this side and the other side of the bar 15, as illustrated by FIG. 3. Both rows lie on the same conveyer belt and are moved upwards according to the speed of the belt. They reach the sensors 17 or 19 which detect whether a closure lid situated in each case under them lies in correct position or wrong position. If it lies with the covering wall pointing upwards towards the sensor, the discharge device belonging to a particular sensor is activated in order to eject this lid laterally. This takes place by activating a short air pulse which results for row R1 in deflection q1 of the lid D10, which is guided laterally by a guide element 30 and deflected downwards in order to fall into the container 1. The same happens with the second row R2 and the sensor 19 arranged here and the ejector 18 provided at a distance therefrom, which may also be operated by compressed air. If the sensor 19 detects a closure lid lying wrongly, a nozzle 18 activates an ejection pulse q2 which leads to the lateral pressing out of the lid D11. This lid is diverted by a deflecting device 31, correspondingly that deflecting device 30, and thrown back downwards into the container 1.

Two wipers 20, 21, which wipe lids lying one on another so that only one layer of lids, but several strings (or rows) of lids are moved upwards, are provided above the two elongated guide track sections on this side and that side of the bar 15.

After the end of the bar 15, the two rows R1, R2 cleared of wrongly-lying lids, symbolised here by the lids D, may be guided together in order to produce a single row of lids, which takes place in sections 4 and 5 of the conveyer path. Reference should thus be made to the illustrations of FIG. 2.

First of all it should also be explained that the two discharge devices 16, 18 are directed outwards, that is operate in opposite direction, in order to discharge the wrong-position closure lids. They fall out—depending on the composition of the rows R1, R2—to the one or other side of the conveyer belt, as is shown clearly also in FIG. 3 by two falling lids below the two guides 30, 31.

The distance "a" may be the same for sensor and discharge device on both sides of the bar 15. It compensates a delay which corresponds essentially to the transit time of the lids between the sensor point and the site of discharge.

To adapt to different heights of the conveyed lids, the sensors may be height-adjustable using an adjusting device on the bar 15, relative to the surface of the conveyer belt. The discharge heads 18, 16 on the other hand are mounted on the central bar 15 at a fixed height.

The magnetic device 50 is indicated in FIG. 1 as placed below the upper strand of the conveyer belt running upwards. Its distance (from the belt) may be adjusted in order to change the magnetic force on the lid and hence the quantity of conveyed lids. The magnetic device 50 is elongated and has a width which is adequate to magnetically attract the closures of preset diameter so that the frictional force of the belt is adequate for conveying. Due to the double-track conveying, the magnetic device extends on both sides of the bar 15. In longitudinal direction, it extends as far as the discharge device and optionally slightly beyond, so that a connection magnetic device 51, which can be seen from FIG. 2, does not leave too great a gap in order to facilitate continuous conveying of the closure lids. The end of the bar 15 is provided in FIG. 1 after the uppermost of the discharge elements 18, 16. The exact position of this end may be changed easily, it should lie in the region of the sensor and discharge device and not extend too far into the guiding-together section 4, in which the lids separated beforehand by the bar 15 are to be guided together. The distance of the connection magnetic device 51 (from the conveyer belt) can also be adjusted in order to change the magnetic force on the conveyed lids.

The speeds v1 drawn in for the first row R1 of closures and v2 for the second row R2 of closures are the same, since both closures lie on the same conveyer belt, only at the beginning separated physically by the separating device 15 designed as the bar which does not touch the belt surface, but is arranged above it.

Section 4 of FIG. 2 follows on from FIG. 1 and its upper end. No central bar is provided in the guiding-together section 4, rather the belt surface of the conveyer belt 10 is free. A magnetic field, aligned at an angle inclined with respect to a central plane 100 of the belt, from an elongated magnetic device 51 guides the metallic closures, or presses them, against the conveyer belt, which moves them upwards due to frictional force. At the same time, the closures are deflected laterally by the alignment of the magnetic device 51. Its conveying speed v3 corresponds essentially to the belt speed and those speeds $v_1$, $v_2$, which was described for the first and second row $R_1$, $R_2$.

The magnetic device 51 is connected essentially to the upper end of the preceding magnetic device 50, but is significantly narrower, preferably essentially half as wide. The magnetic device leads into an inlet, which is formed on the left of a guide member 60 and on the right of an edge 70, which is formed by an elongated guide member or guide strip 71. This guide member 71 can be adjusted in transverse direction $x_{70}$ in order to change the guide edge 70 at a distance from the pivotable left-hand guide member 60.

The magnetic device 51, which is arranged below the upper strand of the conveyer belt 10, extends into the feed hopper between the edge 70 of the guide strip 71 pointing to the left and the edge 62 of the guide member 60 pointing to the right. Its position (inclination) may be changed with respect to the central plane 100 of the conveyer belt in order to be adapted to changes in the position of the guide member 60 and the adjustment of the guide strip 70.

The guide member 60 on the left of the magnetic device 51 is mounted pivotably on a pivotable bearing 60a. It has the previously described inner edge 62 which is orientated at an angle with respect to the central plane and a curved running front edge 63, which may be designed as an edge or as a bar or as a flat section, depending on the height of the guide member. This guide edge is arched so that a closure abutting at a front nose section 61, which is slightly rounded, is pressed either into the feed hopper, or is deflected via the deflecting edge 63 outwards from the conveyer belt 10 in order to fall back into the container 1.

Depending on the number of closures jostling into the feed hopper, a pressure force is formed on the pivotable guide member 60, which facilitates a reaction force via a spring device 66. If the pressure force increases either on the nose section 61 or the inner guide edge 62, the guide member is deflected in order to change the mouth of the feed hopper. Possibly blocking closures at the inlet, as are shown for example in FIG. 3, may be loosened and threading of the closures into the required row of closures following one another closely is facilitated. Wedging at the feed hopper may be avoided, wherein the feed hopper starts wider due to the alignment of the two edges 70, 62 forming it and becomes narrower at the top in order to have its lowest width towards the discharge region 6.

In order to restrict the movement clearance of the guide member 60 which is pivotable in the angle α, a guide 64 is provided which has two end stops for an inner and an outer rest position. A pin 65 is placed in the guide 64, so that pivoting of the guide member 60 at one of the two ends 64a, 64b of the curved slot 64 defines a particular end stop. The inner end stop or the rest position is shown, at which no force is exerted by the lids on the guide member 60 and therefore also no spring force F is produced by the spring device 66 as (resiliently flexible) counter-force.

For stronger pressure, the guide member 60 falls back by a small angle, which is settled up to 30°, preferably in the range between 12° and 20°.

A plate 68 is arranged below the guide member 60 acting like an elongated triangle, on which it can be moved in sliding manner by its pivoting movement. A raised stop 69 arranged opposite serves to accommodate the spring device 66 and for its support relative to the schematically shown belt body, which defines the conveyer belt 10 on both sides.

The nose section 61 serves to separate those closures which are also supplied or aligned to the closure string and those closures which are deflected by the conveyer track and thrown down at the side. The pivotable bearing 60a is arranged at the acute angle of the guide member 60 acting like a triangle opposite the thus formed deflecting edge 63. To clarify the attachment site of the pivotable bearing, the supporting bar 80 is shown broken away in the region of the bearing. In corresponding manner, the bearing 60a is drawn in as a dashed line in FIG. 3 below this supporting bar.

The likewise provided adjustment of the second guide side edge 70 on the guide strip 71 takes place through elongated holes and bolts 72, 73, in each case adapted to an actual diameter of conveyed closure lids.

A further sensor and blow-off arrangement may be arranged at the upper end close to the transition between the feed hopper 5 and the conveying section 6, as was illustrated using devices 18, 19. A safety check takes place here and those closures which in rare cases are passed to this point in wrong position are ejected laterally and fall from here back into the container 1. Ejection takes place in the same manner, as illustrated using the guides 30, 31 acting as tracks in region 3.

An additional guide element 75 may also be arranged opposite the guide strip 71 on the other side of the belt and closer to the sensor and discharge region 3 in order to serve as a safety guide.

The elongated magnetic device 51 may also make a contribution to the described lateral guides 71, 60 and 75 for the guiding together of the closure lids conveyed upwards in several rows. It was thus already described that the elongated magnetic device may laterally deflect the closures during their movement $v_3$. This lateral deflection may be reinforced if the magnetic device is indeed also designed as an elongated magnetic device, but defines independent magnetic tracks, as become clear from FIG. 4. Here too, the elongated magnetic device 51, which can be seen in plan view in region 5 when the conveyer belt 10 is shown broken away, and moreover belt path extending as far as section 3 in dashed line representation is placed below the conveyer belt 10, serves for lateral advancement. A number of individual magnets, which have cylindrical shape, can be seen in FIG. 4. They are arranged at a distance from one another and due to their lining-up form tracks 55, 56, 57 which may be regarded as connecting lines of the particular centres of the cylindrical magnets. The individual magnets themselves are thus mounted in a non-magnetic support 53, which can be seen from FIG. 5. It is arranged below the conveyer belt and has recesses, into which the cylindrical magnets are inserted and hence fixed in their relative position to one another. The non-magnetic support plate 53 has a distance e from the lower side of the conveyer belt 10, which can be seen in FIG. 5 with a lid D (at a diameter d0) serving as an example.

Figure 4:
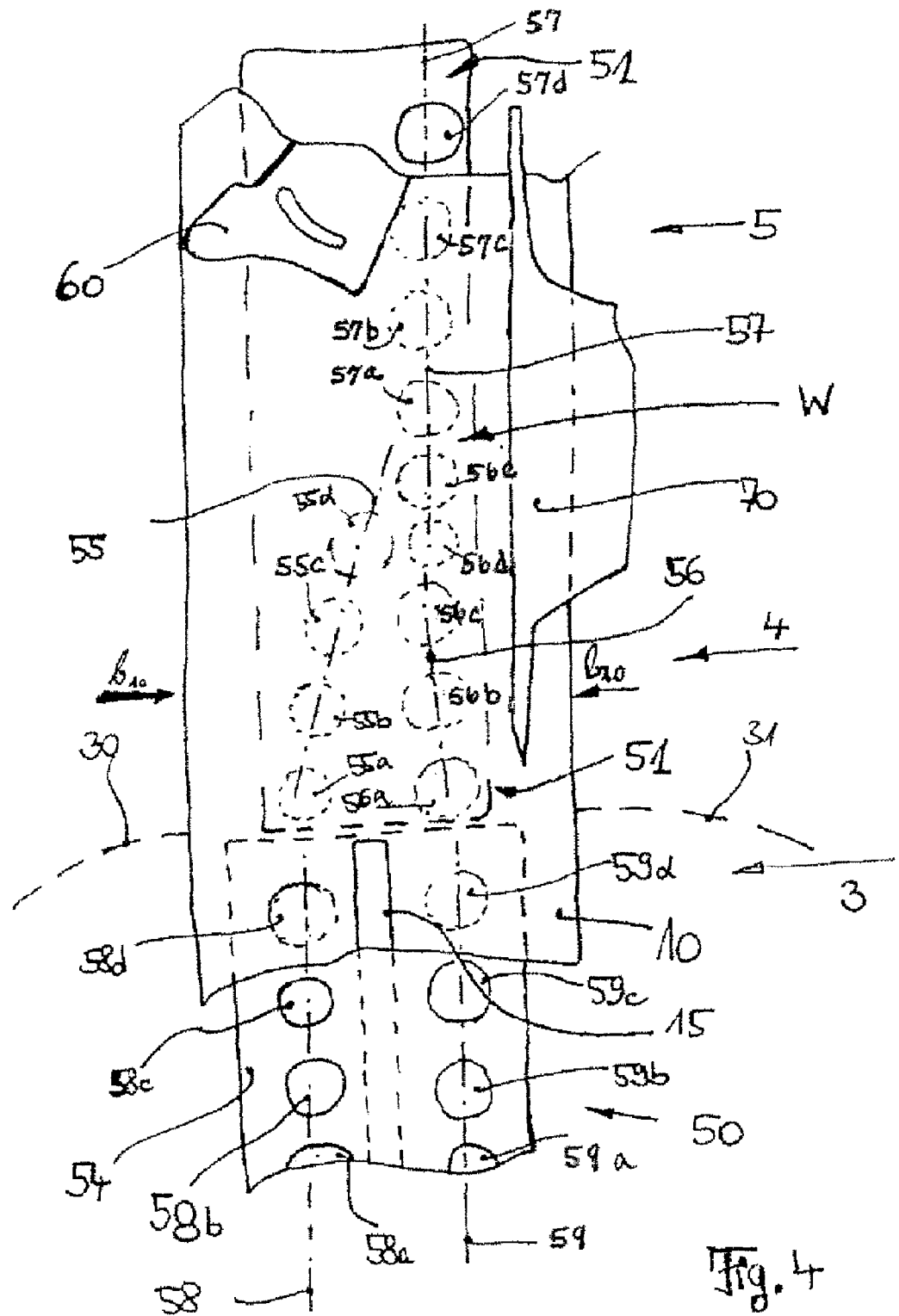
FIG. 4 illustrates schematically elongated magnetic devices 50, 51 which are arranged in the upper part section 3 of the first section 2, 3 and in the lower part section 4 of the second section 4, 5 below the conveyer belt. The magnet pieces, which are circular here, are not closure lids as have been illustrated in FIGS. 1 to 3.
Figure 5:
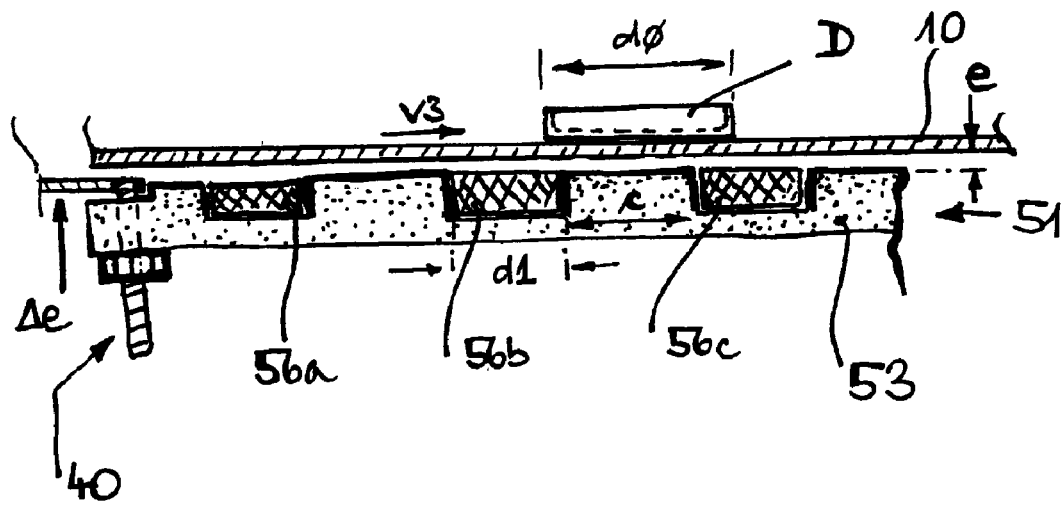
FIG. 5 is a section in the direction of the central plane corresponding to the track path 56, wherein at the top the conveyer belt 10 and at the bottom an elongated support device 53 with the magnet pieces, which can be seen in FIG. 4, are shown in detail.

The track 56, which is shown in FIG. 5 in section, can be seen from FIG. 4. The lining-up of the cylindrical magnets 56a, 56b, 56c, 56d, 56e produces a continuation of the track guide of the right-hand row R2, which is shown in FIG. 4 as track 59. The second track 55 of magnets 55a, 55b, . . . 55d running at an angle with respect to the track section 56 conveys the closure lids of the left-hand row R1 cleared of wrongly lying closures into a points section in the guiding-together region 4, to which the track 57 is connected, which runs essentially parallel to the track 56. Here too, individual magnets are inserted in the support plate 53 at a distance from one another, so that the centres of the magnets 57a to 57d produce the track guide of the guide line 57.

The track sections 55, 56 and 57 may also have different inclinations with respect to one another if they have in common in the guiding-together region a cutting point, in which the lids from the two rows $R_1$ and $R_2$ are guided together in order to be introduced into the hopper inlet between the pivotable guide member 60 and the right-hand guide strip 71. In the example shown of FIG. 4, it can be seen that the guide line 56 of the individual magnets 56a to 56e has at the start a slight inclination with respect to the central plane of the conveyer belt 10. At least two of the conveyer devices 55 to 57 have different inclinations with respect to the central plane 100 described.

The elongated magnetic device 50, which extends into the sensor and discharge region 3, may also be designed in the same manner. For it, the guide devices 58, 59 as connection of the centres of the individual magnets, are however aligned in parallel and have no inclination to one another whatever. The individual magnets 58a to 58d form the conveyer device 58 on the left of the central bar 15, whereas the individual magnets 59a to 59d clarify the conveyer device 59 on the right of the central bar 15. The elongated conveyer device 50 can be seen in plan view due to the belt section 10 shown broken away. It also has an elongated support device 54, into which the magnets are thus inserted, like that described using FIG. 5 for the elongated conveyer device 51.

Figure 6:
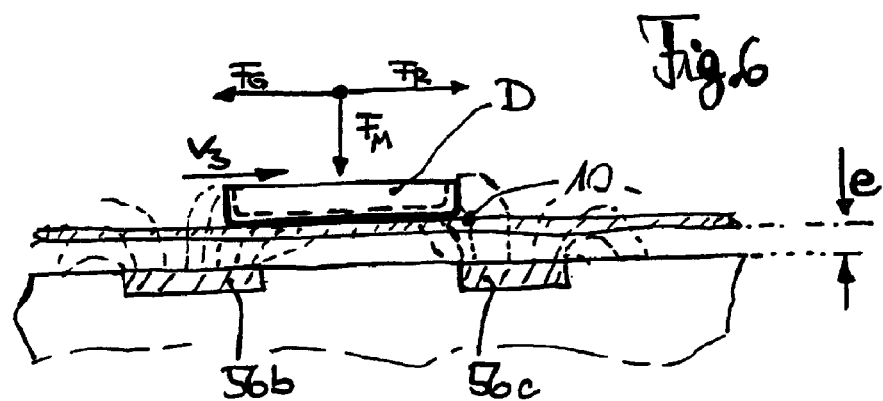
FIG. 6 is a schematic view of the distance relationships of the magnet pieces based on a closure lid D to be conveyed.

Reference may be made to FIG. 5 and FIG. 6 regarding the arrangement, positioning and relative alignment of the individual magnets.

A ferromagnetically acting lid, which is attracted by the individual magnets 56b, 56c, has such a diameter d0 that always at least one, preferably both, magnets may have influence on it in an intermediate region, in order to be able to ensure the force $F_M$ during conveying at such a height (amount), that during an upward movement according to FIGS. 1 to 4, the weight $F_G$ does not become greater than the opposite-acting frictional force $F_R$, which in the case of static friction is proportional to the force of attraction $F_M$. The distance "e" used for adjusting this force may be preset via the adjusting device 40 by $\Delta e$.

The distance "c" of the individual magnets in the support plate 53 according to FIG. 5 is determined so that it should not be greater, preferably even somewhat smaller, than the smallest lid diameter d to be conveyed. The diameter d1 of the individual magnet pieces is relatively small based on the belt width $b_{10}$, for example below 15%, so that there is considerable freedom for positioning the individual magnet pieces.

They may be arranged along the tracks 55, 56 and 57, optionally also 58 and 59, in each case designated as conveying direction or conveying line, also offset with respect to one another in order to take into account the cylindrical shape and to reduce the distance which the closest-lying edges of the magnet pieces have, as clarified in FIG. 5 using the distance c.

If the individual magnet pieces have adequate force of attraction, the track guiding applied by the tensile force $F_M$ and guiding of the lids to be orientated laterally to one another in the guiding-together region may be achieved virtually just by the individual magnets, without considerable lateral guide elements being necessary. For example the safety guide 75 could be omitted.

The individual track sections 55, 56, 57, their inclination to one another and a certain length of the individual sections, which is preset in each case, thus make a considerable contribution to guiding-together of the parallel rows $R_1$, $R_2$ in an entire row $R_3$ for introduction into the hopper section and further conveying to the discharge section 6.

I claim:

1. A method for upwardly conveying closures made from sheet metal, the conveying upwards from a collecting point to a higher release point, wherein at the release point same-lying closures are released, and wherein the method comprises:
   (a) conveying more than one row of arbitrary lying closures upwardly to a sensor-and-discharge-device on a single conveyer belt;
   (b) discharging wrong-lying closures in the more than one row of arbitrary lying closures towards opposite sides at the sensor-and-discharge-device such that closures that remain on the single conveyor belt are same-lying closures in the more than one row; and
   (c) guiding together, after the sensor-and-discharge-device, the more than one row of same-lying closures by a resiliently tensioned guide member that provides for a single line of same-lying closures conveyed towards the release point on the single conveyor belt to be released as the same-lying closures at the higher release point.

2. The method according to claim 1, further comprising:
   conveying the more than one row of arbitrary lying closures to the sensor-and-discharge-device on separate tracks on the single conveyer belt, wherein a track separation is present prior and before and is removed after and behind the sensor-and-discharge-device.

3. The method according to claim 1, further comprising arranging a magnetic device, inclined at an angle with respect to a central plane of the single conveyer belt, between the sensor-and-discharge-device and the release point, the magnetic device configured to guide the more than one row of same-lying closures together on the single conveyer belt in a correctly lying row.

4. The method according to claim 3, further comprising:
   adjusting the angle of inclination of the magnetic device with respect to the central plane to accommodate various closure sizes.

5. The method according to claim 1, further comprising:
   supplying two rows of the arbitrary lying closures to the sensor-and-discharge-device on the single conveyer belt, the two rows being separated by a bar of a defined length.

6. The method according to claim 1, further comprising exerting a pressure force on the resiliently tensioned guide member, the force facilitating a reaction force via a spring device.

7. The method according to claim 6, further comprising deflecting the guide member upon an increase of the pressure force either on a nose section or an inner guide edge of the tensioned guide member, and upon such deflection a mouth width of an intake opening towards the release point is changed, and any closures blocking the intake opening are loosened.

* * * * *